(12) United States Patent
Liao

(10) Patent No.: US 6,344,605 B1
(45) Date of Patent: Feb. 5, 2002

(54) MULTI-ORIENTATION ADJUSTABLE CLAMP DEVICE CLAMPING AT DRUM'S COUNTERHOOP

(75) Inventor: Tsun-Chi Liao, Taichung (TW)

(73) Assignee: Hwa Shin Musical Instrument Co., Ltd., Taichung City (TW)

( * ) Notice: Subject to any disclaimer, the term of this patent is extended or adjusted under 35 U.S.C. 154(b) by 0 days.

(21) Appl. No.: 09/553,057

(22) Filed: Apr. 20, 2000

(51) Int. Cl.[7] ............................................... G10D 13/02
(52) U.S. Cl. ........................................... 84/421; 84/327
(58) Field of Search ..................... 84/421, 327; 117/99

(56) References Cited

U.S. PATENT DOCUMENTS

| | | | | |
|---|---|---|---|---|
| 5,756,912 A | * | 5/1998 | Liao | 84/421 |
| 5,927,670 A | * | 7/1999 | Hsieh | 248/405 |
| 6,057,500 A | * | 5/2000 | Liao | 84/422.3 |
| 6,093,878 A | * | 7/2000 | Hoshino | 84/421 |
| 6,162,978 A | * | 12/2000 | Chang | 84/421 |
| 6,177,621 B1 | * | 1/2001 | Hoshino | 84/422.3 |

* cited by examiner

Primary Examiner—Marlon T. Fletcher
Assistant Examiner—Kim Lockett
(74) Attorney, Agent, or Firm—Bacon & Thomas, PLLC

(57) ABSTRACT

A multi-orientation adjustable clamp device comprises a stationary and a movable clamp, wherein a stationary connector disposed on a top end of the stationary clamp is pivotally jointed with a locking block by a linking stud, and a fixing hole is formed at one end of the linking stud for fixing a linking lever. The structure of the clamp device is characterized in: disposing a crank between the stationary clamp and the locking block; and, a first and a second connector arranged at two ends of the crank respectively for coupling with the stationary connector and the locking block individually to form two pivot-joint devices to offer a multi-orientation adjustable function to this invention.

2 Claims, 6 Drawing Sheets for clamping at a drum's counterhoop for adjusting inclination angle of appended instruments, such as cymbal, etc.

MULTI-ORIENTATION ADJUSTABLE CLAMP DEVICE CLAMPING AT DRUM'S COUNTERHOOP

BACKGROUND OF THE INVENTION

This invention relates generally to a percussion musical instrument, more particularly, it relates to a multi-orientation adjustable clamp device clamping at drum's counterhoop for adjusting inclination angle of appended instruments, such as cymbal, etc.

A clamp device clamping at drum's counterhoop is used to hold an appended musical instrument, a cymbal for example. The inventor of the present invention has ever proposed a clamp device shown in FIG. 1, wherein the clamp device is held with a clamping block and a clamping piece for clamping at a drum's counterhoop, and a circular cup and a conic piece are provided at positions above the clamping block for plugging linking lever in different shapes and sizes to fit different appending instruments (cymbal, etc) and for easy replacement, meanwhile, the relative orientation and angle between the linking lever and the appended instrument may be adjusted in large scale for obtaining the best combination.

At this time, in short, the present invention is proposed to offer a multi-orientation adjustable mechanism in addition to abovesaid previous framework for expanding function of the clamp device.

SUMMARY OF THE INVENTION

The primary object of this invention is to provide a clamp device clamping at drum's counterhoop for disposing an appending musical instrument and allowing it to be adjusted in multiple orientations.

In order to realize abovesaid object, the multi-orientation adjustable clamp device comprises a stationary and a movable clamp, wherein a stationary connector disposed on a top end of the stationary clamp is pivotally jointed with a locking block by a linking stud, and a fixing hole is formed at one end of the linking stud for fixing a linking lever. The structure of the clamp device is characterized in:

disposing a crank between the stationary clamp and the locking block; and, a first and a second connector arranged at two ends of the crank respectively for coupling with the stationary connector of the stationary clamp and the locking block individually to form two pivot-joint devices to offer a multi-orientation adjustable function to this invention.

For more detailed information regarding this invention together with further advantages or features thereof, at least an example of preferred embodiment will be elucidated below with reference to the annexed drawings.

BRIEF DESCRIPTION OF THE DRAWINGS

The related drawings in connection with the detailed description of this invention to be made later are described briefly as follows in which.

DETAILED DESCRIPTION OF THE PREFERRED EMBODIMENT

Figure 1:
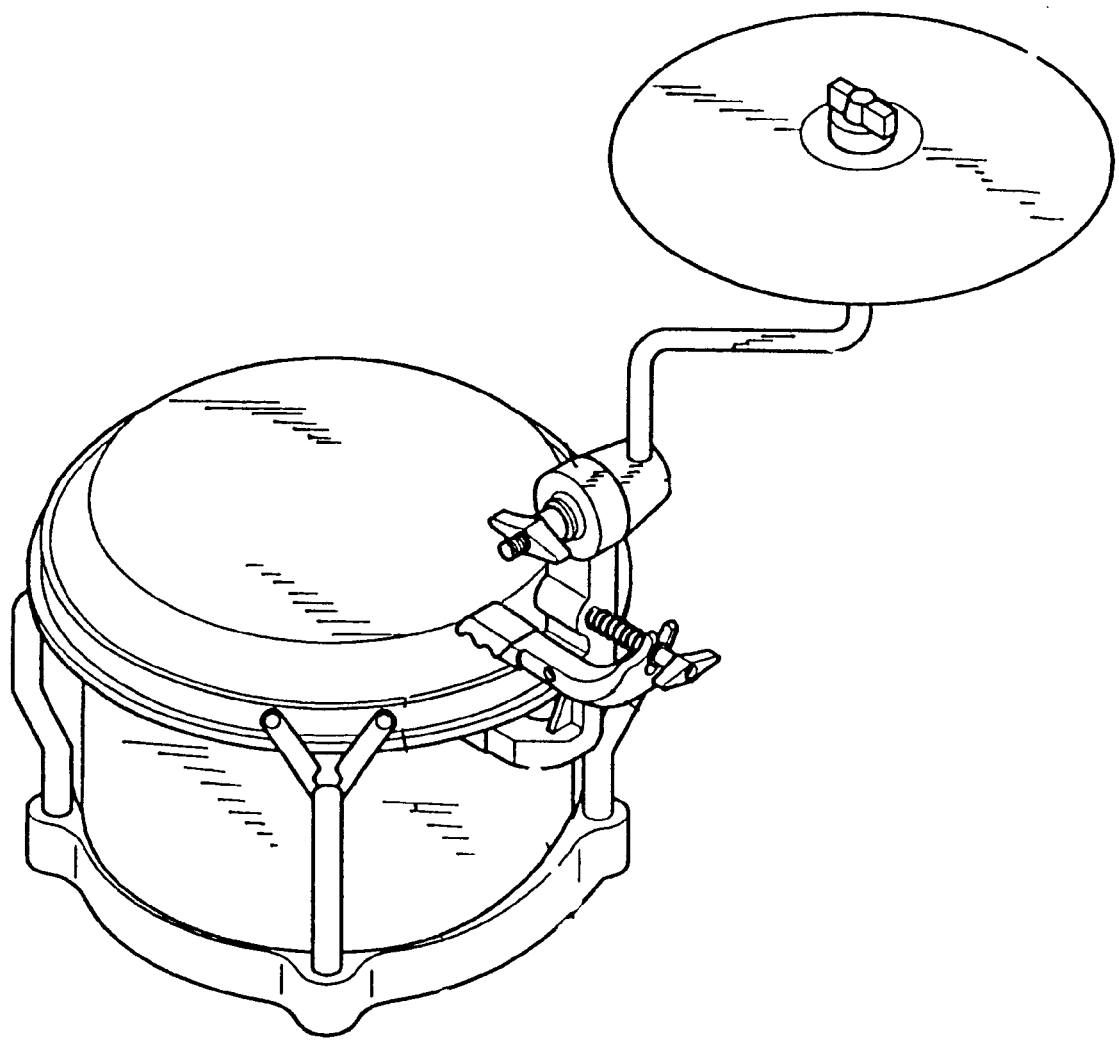
FIG. 1 is an elevational view of a conventional clamp device for clamping at a drum's counterhoop.

As shown in FIG. 2 through FIG. 6, a clamp device of this invention clamping at drum's counterhoop mainly comprises a stationary clamp 10, a movable clamp 20, a locking block 30, a linking stud 40, and a crank 60.

The stationary clamp 10 is L-shaped with a clamping piece 11 at its tail end and a stationary connector 12 at its upper end, wherein a circular through hole 13 is formed in center and a tooth row 14 is arranged in inner wall of the stationary connector 12 respectively; and, a tapped hole 15 is formed adjacent to center position in the stationary clamp 10.

The movable clamp 20 is pivotally disposed at predetermined position on inner face of the stationary clamp 10, wherein a clamping piece 21 is provided to the movable clamp 20 at a position corresponding to the clamping piece 11 of the stationary clamp 10 for clamping a counterhoop 4; a fork mouth 22 is formed at the other end of the movable clamp 20; and an adjustment stud 24 with a collared spring 23 is used to pivotally fixed the movable clamp 20 to form a labor savable lever-lock device for adjusting clamping width of the clamping piece 11, 21.

The locking block 30 is provided with a through hole 31, a gap 32 transversely striding the through hole 31 in outside end of the locking block 30, and a tooth row 33 formed at its other end.

The linking stud 40 penetrates the through hole 31 in the locking block 30, wherein a fixing hole 41 is disposed at one end of the linking stud 40 for plugging a linking lever 50 of a fixable cymbal 8 inside.

The crank 60 is sandwiched between the stationary clamp 10 and the locking block 30, wherein a first and a second connector 61, 62 are arranged at each end of the crank 60 for coupling with the stationary connector 12 of the stationary clamp 10 and the locking block 30 respectively to form two pivot-joint devices, and further, to enable this invention to be adjustable in multiple orientations. The pivot joint is made by: forming a bore 63 in center of the first connector 61 for a fixing stud 51 to penetrate through the bore 63 and the circular through hole 13 in the stationary connector 12 to further pivotally joint with the crank 60 and the stationary clamp 10; and, forming a through hole 64 in center of the second connector 62 for the linking stud 40 to penetrate through the through hole 64 and the through hole 31 in the locking block 30 to thereby pivotally joint with the crank 60 and the locking block 30.

Figure 2:
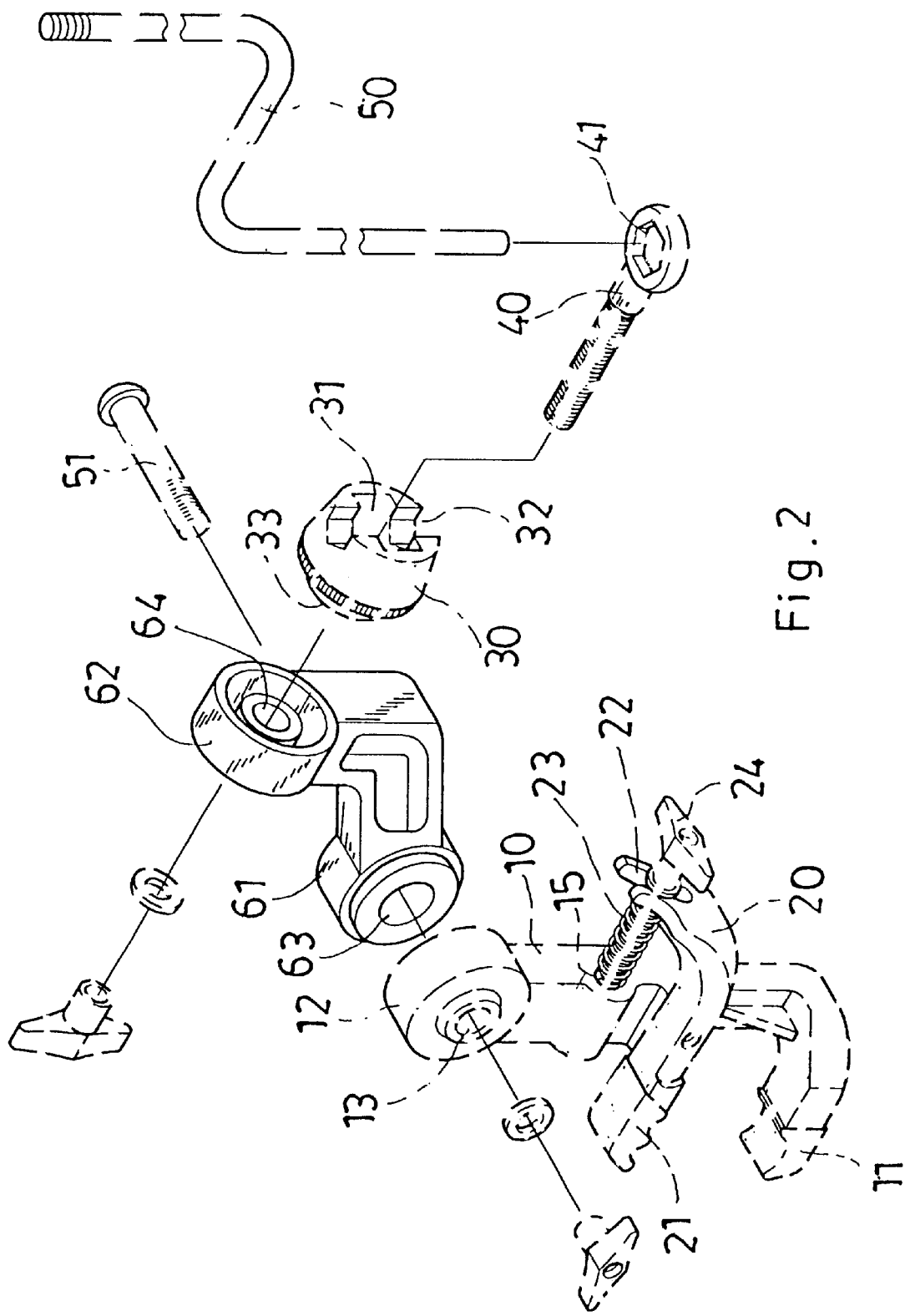
FIG. 2 is a three-dimensional exploded view of this invention.
Figure 3:
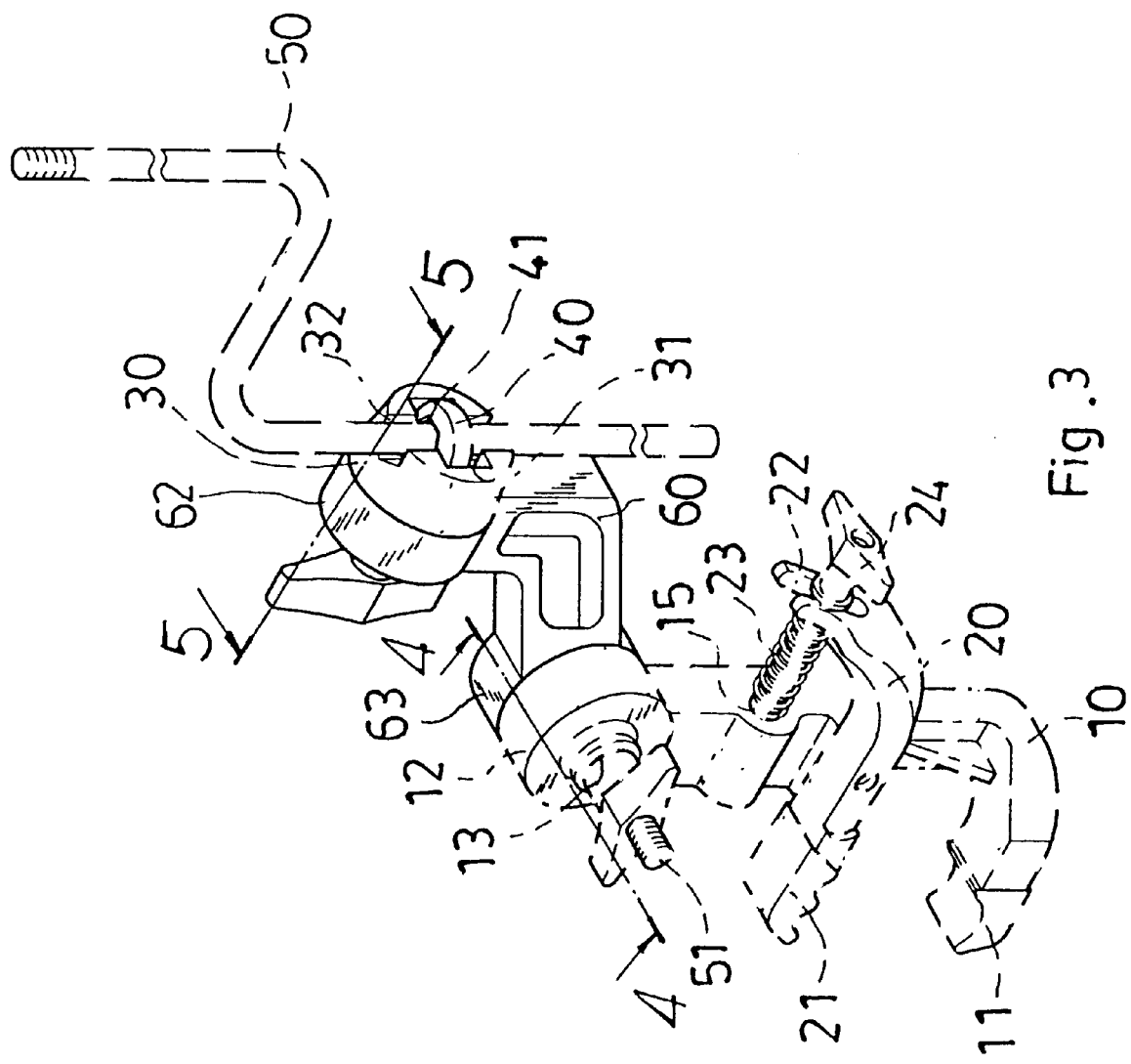
FIG. 3 is an assembled view of this invention in three dimensions.
Figure 4:
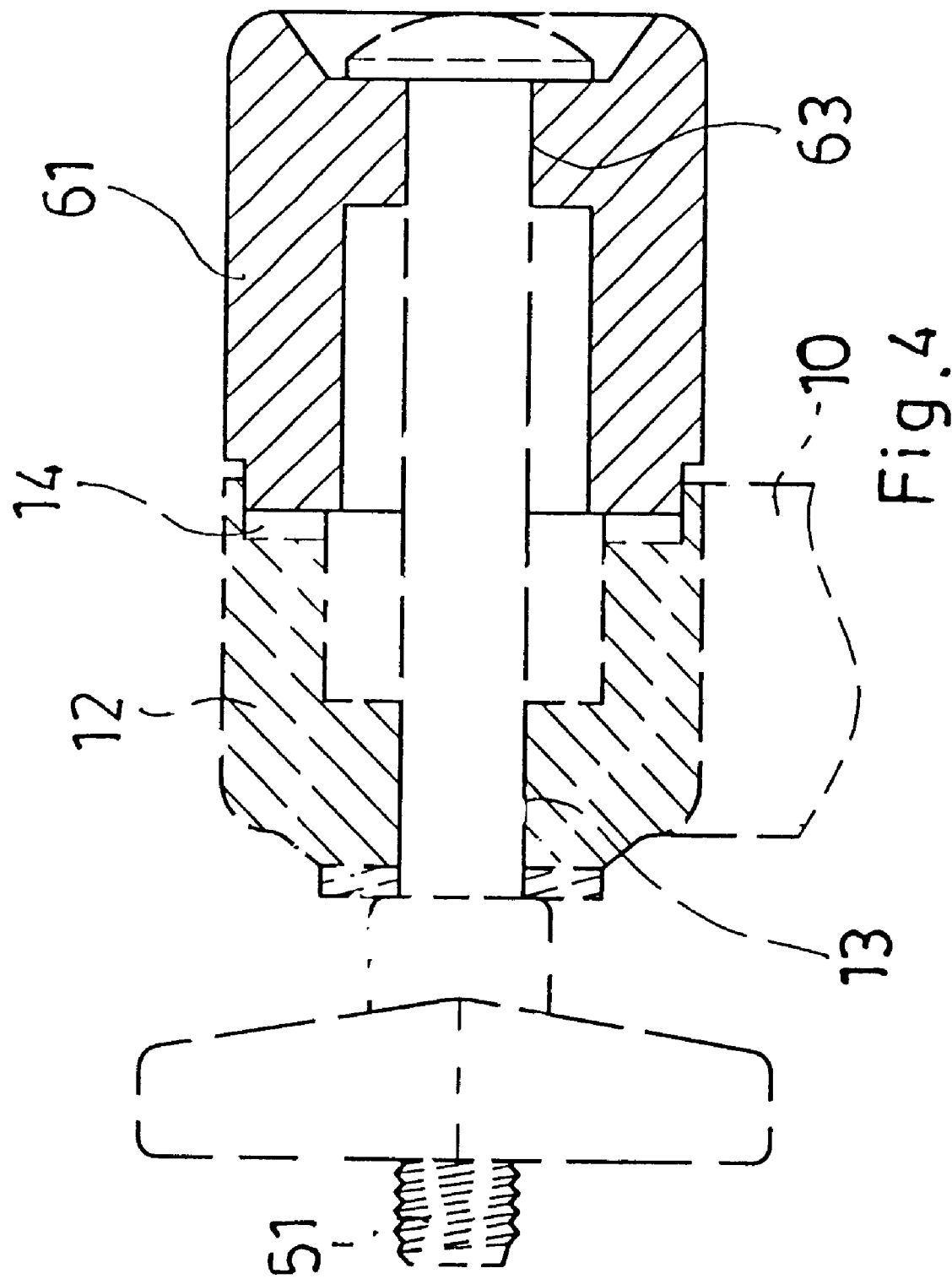
FIG. 4 is a cutaway sectional view of FIG. 3 taken along line 4—4.
Figure 5:
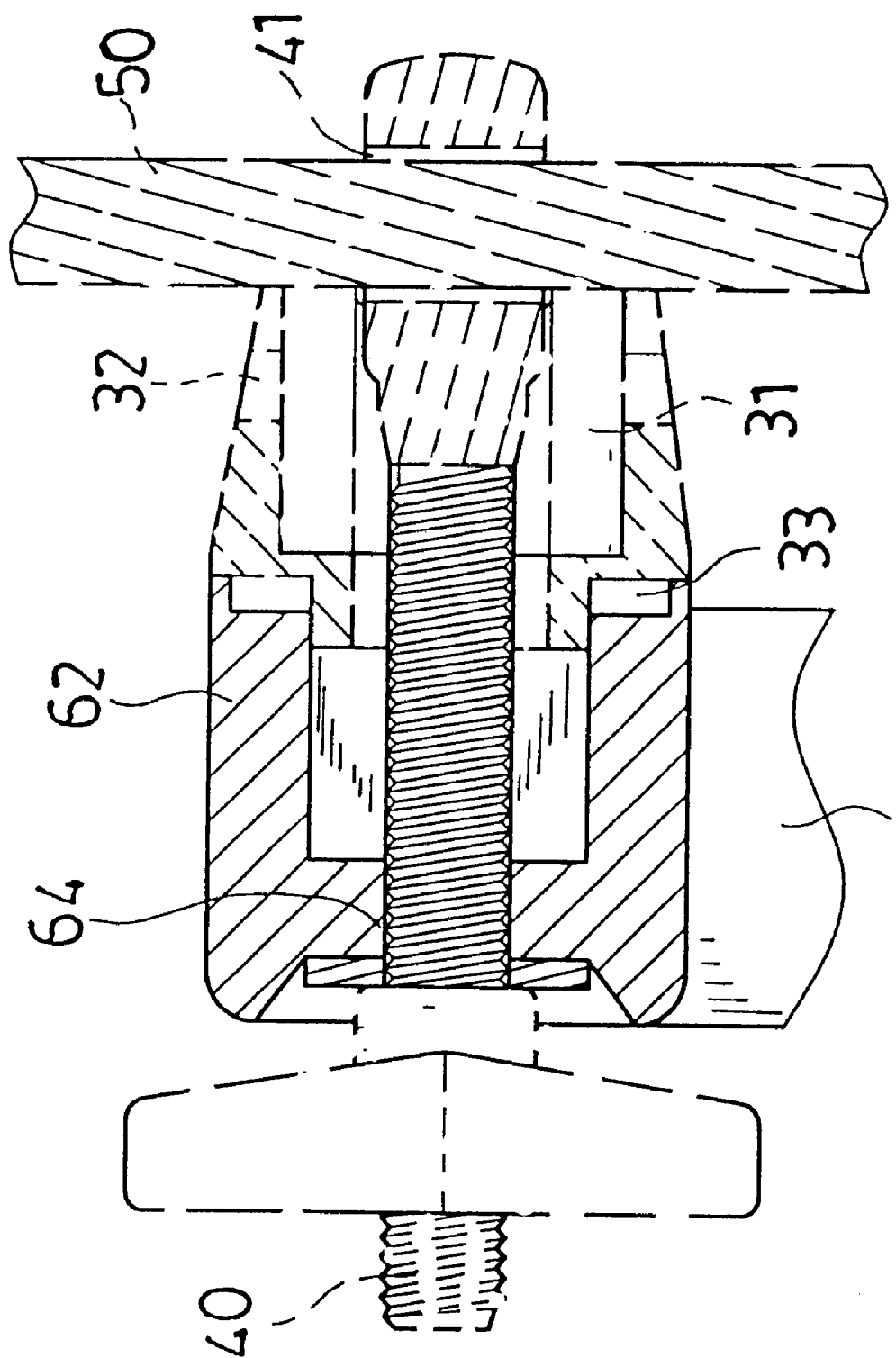
FIG. 5 is a cutaway sectional view of FIG. 3 taken along line 5—5.
Figure 6:
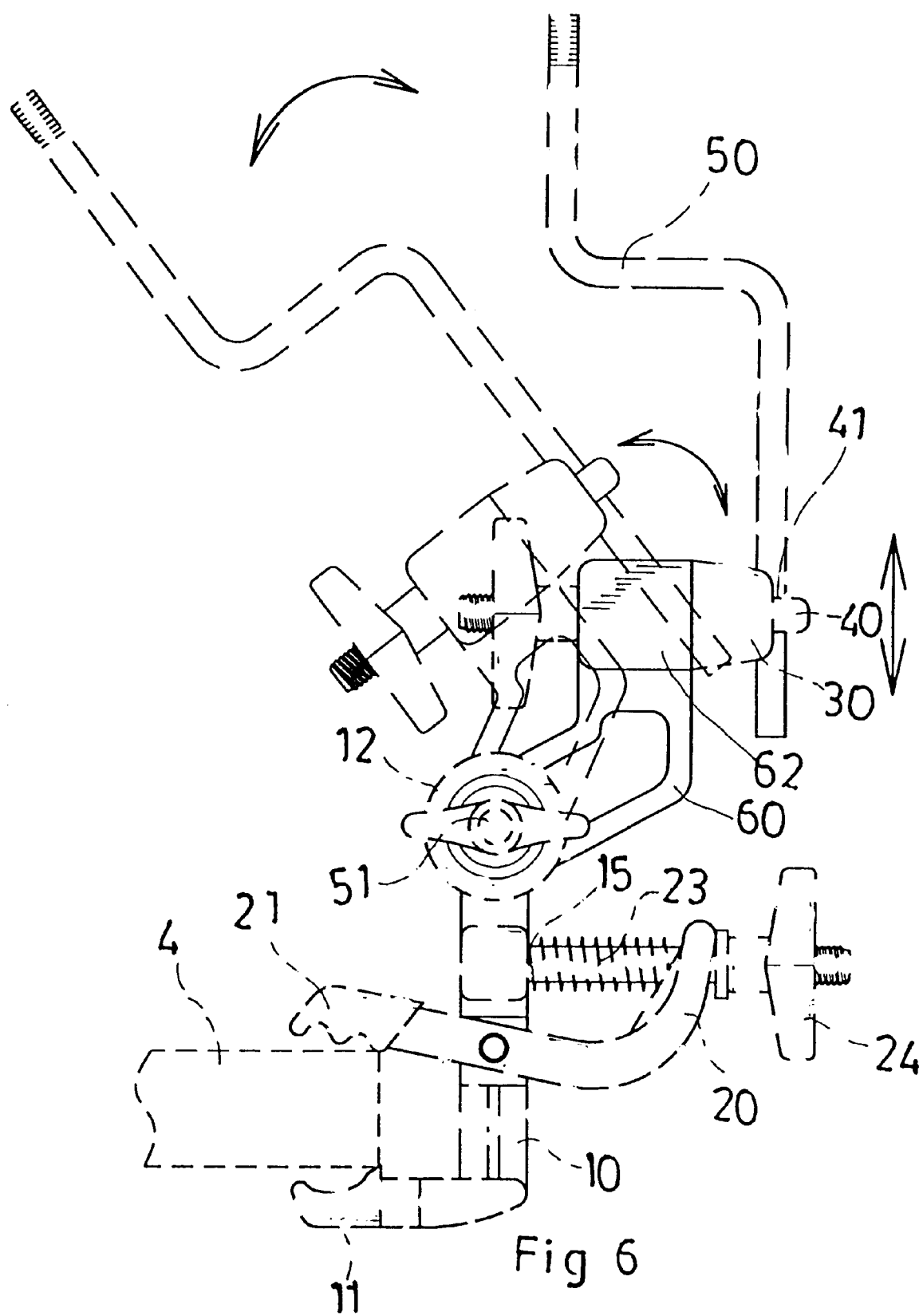
FIG. 6 illustrates an application example of this invention.

In assembling the elements shown in FIG. 2 to form this invention shown in FIG. 3, the fixing stud 51 and the linking stud 40 are taken to pivotally joint the stationary clamp 10, the movable clamp 20, and the locking block 30 together, then, the adjustment stud 24 and the clamping piece 11, 21 are taken to hold and clamp this invention at the counterhoop 4, and the linking lever 50 with an attached cymbal 8 is plugged in the fixing hole 41 of the linking stud 40.

When adjustment of inclination angle of the cymbal 8 is desired, a user is supposed to swivel reversely to loosen the fixing stud 51, turn the crank 60 and the stationary clamp 10 to proceed stepless adjustment of the inclination angle under assistance of the favorable tooth row 14 in the stationary connector 12, then lock the fixing stud 15 again after adjustment. Similarly, the user may swivel to loosen the linking stud 40, turn the crank 60 and the locking block 30 to proceed stepless adjustment of the inclination angle under assistance of the tooth row 33 in the locking block 30, and meanwhile, adjust vertical position of the linking lever 50 if required, then lock the linking stud 40 again after adjustment.

Although, this invention has been described in terms of preferred embodiments, it is apparent that numerous variations and modifications may be made without departing from the true spirit and scope thereof, as set forth in the following claims.

What is claimed is:

1. A multi-orientation adjustable clamp device for a drum counterhoop, comprising:

a stationary and a movable clamp, wherein a stationary connector disposed on a top end of said stationary clamp is pivotally jointed to a locking block with a linking stud; a fixing hole is formed at one end of said linking stud for fixing a linking lever; and the structure of said clamp device being characterized in:

disposing a crank between said stationary clamp and said locking block; and, a first and a second connector arranged at two ends of said crank respectively for coupling with said stationary connector and said locking block individually to thereby form two pivot-joint devices for providing a multi-orientation adjustable function to the clamp.

2. The multi-orientation adjustable clamp device clamping at drum's counterhoop according to claim 1, wherein a bore and a through hole are formed in the first and the second connector respectively for a fixing stud and said linking stud to penetrate individually and pivotally joint with said crank and said stationary clamp.

* * * * *